(12) United States Patent
Brunet et al.

(10) Patent No.: US 10,899,610 B2
(45) Date of Patent: Jan. 26, 2021

(54) METHOD FOR PRODUCING HIGH-PURITY HYDROGEN GAS AND/OR NANOMAGNETITE

(71) Applicants: Centre National De La Recherche Scientifique, Paris (FR); Universite d'Aix Marseille, Marseilles (FR)

(72) Inventors: Fabrice Brunet, Coublevie (FR); Benjamin Malvoisin, Gieres (FR); Olivier Vidal, Saint Martin D'uriage (FR); Bruno Goffe, Marseilles (FR); Camille Crouzet, Gieres (FR)

(73) Assignees: Centre National De La Recherche Scientifique, Paris (FR); Universite d'Aix Marseille, Marseilles (FR)

( * ) Notice: Subject to any disclaimer, the term of this patent is extended or adjusted under 35 U.S.C. 154(b) by 0 days.

(21) Appl. No.: 15/490,301

(22) Filed: Apr. 18, 2017

(65) Prior Publication Data

US 2017/0217770 A1   Aug. 3, 2017

Related U.S. Application Data

(63) Continuation-in-part of application No. 14/781,056, filed as application No. PCT/EP2014/056489 on Mar. 31, 2014, now abandoned.

(30) Foreign Application Priority Data

Mar. 29, 2013 (EP) ..................... 13305411
Jun. 6, 2016 (FR) ..................... 16 55158

(51) Int. Cl.
C01B 3/06   (2006.01)
C01G 49/08   (2006.01)

(52) U.S. Cl.
CPC .............. *C01B 3/061* (2013.01); *C01G 49/08* (2013.01); *C01P 2004/03* (2013.01); *C01P 2004/04* (2013.01); *C01P 2004/61* (2013.01); *C01P 2004/62* (2013.01); *C01P 2004/64* (2013.01); *C01P 2006/42* (2013.01); *C01P 2006/80* (2013.01)

(58) Field of Classification Search
CPC ..................................................... C01B 3/61
See application file for complete search history.

(56) References Cited

U.S. PATENT DOCUMENTS

| | | | |
|---|---|---|---|
| 3,318,687 A | 5/1967 | Bowden | |
| 3,442,619 A | 5/1969 | Huebler et al. | |
| 5,004,496 A * | 4/1991 | Aune | C21C 5/38 266/148 |
| 5,830,426 A | 11/1998 | Werth | |
| 2004/0101474 A1 * | 5/2004 | Otsuka | B01J 8/025 423/657 |
| 2005/0191231 A1 * | 9/2005 | Sun | C09C 1/24 423/632 |
| 2010/0111826 A1 | 5/2010 | Bhattacharjee et al. | |
| 2010/0212457 A1 * | 8/2010 | Drnevich | C01B 3/061 75/414 |
| 2012/0027672 A1 * | 2/2012 | Wang | B82Y 30/00 423/658 |
| 2012/0225007 A1 * | 9/2012 | Park | C01B 3/105 423/632 |
| 2013/0206041 A1 * | 8/2013 | Van Mechelen | C04B 18/142 106/709 |
| 2019/0300381 A1 | 10/2019 | Brunet et al. | |

FOREIGN PATENT DOCUMENTS

| | | |
|---|---|---|
| EP | 1386881 A1 | 2/2004 |
| EP | 1516853 A1 | 3/2005 |
| EP | 2749536 A1 | 7/2014 |
| GB | 191219002 A | 7/1913 |
| RU | 2528918 C1 | 9/2014 |
| WO | 2007/125537 A1 | 11/2007 |
| WO | WO2010132784 | * 11/2010 |
| WO | WO2011145080 | * 11/2011 |
| WO | WO 2012/007591 | * 1/2012 |

OTHER PUBLICATIONS

Thermodynamic Calculation of Generation of H2 Gas by Reaction between FeO in steelmaking slag and Water Vapor. Hiroyuki Matsuura et al. ISIJ International, vol. 52, No. 8, pp. 1503-1512 (Year: 2012).*
Carbonation of Steel Slag for CO2 Sequestration: Leaching of Products and Reaction Mechanisms Wouter J. J. Huijgen et al Envrron. Sci. Technol. vol. 40, pp. 2790-2796 (Year: 2006).*
Hydrogen production by steam-iron process Viktor Hacker et al. Journal of Power Sources, vol. 86, pp. 531-535 (Year: 2000).*
European Search Report issued in corresponding European Application No. 13305411.4, dated Jul. 23, 2013.
International Search Report issued in corresponding International Application No. PCT/EP2014/056489, dated May 28, 2014.
International Preliminary Report on Patentability issued in corresponding International Application No. PCT/EP2014/056489, dated Sep. 29, 2015.
Mastuura et al. "Thermodynamic Calculation of Generation of H2 Gas by Reaction between FeO in Steelmaking Slag and Water Vapor", ISIJ International, vol. 52, No. 8, Jan. 1, 2012, pp. 1503-1512.

(Continued)

*Primary Examiner* — Douglas B Call
(74) *Attorney, Agent, or Firm* — Banner & Witcoff, Ltd.

(57) ABSTRACT

The disclosure relates to a method for producing hydrogen gas and/or magnetite comprising the steps of reacting a wüstite-containing material, such as steel slags, with $H_2O$ at a temperature ranging from 150° C. to 500° C., cooling down the gaseous reaction product to separate hydrogen gas from water steam and collecting hydrogen gas, and recovering magnetite from the solid reaction product.

20 Claims, 6 Drawing Sheets

(56) References Cited

OTHER PUBLICATIONS

De Windt L. et al. "Kinetics of steel slag leaching: Batch tests and modeling", Waste Management, Elsevier, New York, NY, US, vol. 31, No. 2, Feb. 1, 2011, pp. 225-235.
Rapiscan Systems Satmagan Model 135 Saturation Magnetization Analyser Product manual pp. 1-7, Oct. 2005.
Chaurand P, Rose J, Bottero J-Y, Domas J. Speciation of Cr and V within BOF steel slag reused in road constructions. J. Geochem. Explor. 2006;88:10-14.
Chaurand P, Rose J, Briois V et al. New methodological approach for the vanadium K-edge X-ray absorption near-edge structure interpretation: Application to the speciation of vanadium in oxide phases from steel slag . J. Phys. Chem. B 2007;111:5101-5110.
Chaurand P, Rose J, Briois V et al. Environmental impacts of steel slag reused in road construction: A crystallographic and molecular (XANES) approach. J. Hazard. Mater. 2007;139:537-542.
De Windt L, Chaurand P, Rose J. Kinetics of steel slag leaching: Batch tests and modeling. Waste Manage. 2011;31:225-235.
Montes-Hernandez G, Pérez-Lopez R, Renard F, Nieto JM, Charlet L. Mineral sequestration of CO2 by aqueous carbonation of coal combustion fly-ash. J. Hazard. Mater. 2009;161:1347-1354.
Brunet F, Chopin C. Bearthite, Ca2Al(PO4)2(OH): Stability, thermodynamic properties and phase relations. Contrib. Mineral. Petrol. 1995;121:258-266.
Taut T, Kleeberg R, Bergmann J. The new Seifert Rietveld program BGMN and its application to quantitative phase analysis. Mater. Struc. 1998;5:57-66.
Saalfeld H, Klaska, KH. The crystal structure of 6 Ca2SiO4 . 1 Ca3(PO4)2. Zeitschrift für Kristallographie 1981;155:65-73.
Colville AA, Geller S. The crystal structure of brownmillerite, Ca2FeAlO5. Acta Cryst. 1971; B27:2311-2315.
Basso R, Giusta AD, Zefiro L. Crystal structure refinement of plazolite: a highly hydrated natural hydrogrossular. Neues Jahrbuch für Mineralogie 1983;251-258.
t Malvoisin B, Carlut C, Brunet F. Serpentinization of oceanic peridotites: 1. A high-sensitivity method to monitor magnetite production in hydrothermal experiments. J. Geophys. Res. 2012;117:B01104.
Marbán G, Valdés-Solís T. Towards the hydrogen economy? Int. J. Hydrogen Energ. 2007;32:1625:1637.
Iida et al. (2007) Synthesis of Fe3O4 nanoparticles with various sizes and magnetic properties by controlled hydrolysis Journal of Colloid and Interface Science 314 274-280.
Martinez-Mera et al. (2007) Synthesis of magnetite (Fe3O4) nanoparticles without surfactants at room temperature. Materials Letters 61, 4447-4451.
Malvoisin B., Brunet F., Carlut J., Montes-Hernandez G., Findling N., Lanson M., Vidal O., Bottero J. Y. and Gaffé B. (2013) High-purity hydrogen gas from the reaction between BOF steel slag and water in the 473-673 K range. Int. J. Hydrogen Energ. 38(18), 7382-7393.
Eloneva et al. (2008) Steel converter slag as a raw material for precipitation of pure calcium carbonate. Ind. Eng. Chem. Res., 47, 7104-7111.
Kelland (1998) Magnetic separation of nanoparticles. IEEE transactions on magnetics, 34, 2123-2125.
Malvoisin, et al., High-purity hydrogen gas from the reaction between BOF steel slag and water in the 473-673 K range, International Journal of Hydrogen Energy, Elsevier, 2013, 38 (18), 7382-7393.

* cited by examiner

METHOD FOR PRODUCING HIGH-PURITY HYDROGEN GAS AND/OR NANOMAGNETITE

RELATED APPLICATIONS

This application is a Continuation in part of U.S. application Ser. No. 14/781,056 and filed Sep. 29, 2015, now abandoned, which is a National Stage Application under 35 U.S.C. 371 of co-pending PCT application PCT/EP2014/056489 designating the United States and filed Mar. 31, 2014; which claims the benefit of EP application number 13305411.4 and filed Mar. 29, 2013 and FR application number 1655158 and filed Jun. 6, 2016 each of which are hereby incorporated by reference in their entireties.

TECHNICAL FIELD

The present invention relates to a method for producing high-purity hydrogen gas and magnetite in the form of nanometric size particles below 500° C. More particularly, the present invention relates to a method for producing high-purity hydrogen gas and/or nanomagnetite by reacting steel slags, in particular wüstite contained in steel slags, with $H_2O$ in hydrothermal conditions.

BACKGROUND OF THE INVENTION

Hydrogen fuel cells are a promising technology for use as electrical power sources. With only water as by-product and no greenhouse gases emissions, hydrogen provides considerable environmental benefits.

Hydrogen can be produced in several ways. The steam-iron process is one of the oldest known methods for producing hydrogen. It is a cyclic process in which coal is gasified to a lean reducing gas comprising $H_2$ and CO. This gas then reacts with iron oxide, typically magnetite ($Fe_3O_4$), to produce a reduced form of iron oxide, wüstite (FeO) and/or iron metal (Fe). The reduced iron is then re-oxidized with steam to form magnetite and/or wüstite and $H_2$. The steam-iron process takes place at temperatures ranging from 600 to 900° C. or, eventually, at lower temperature when catalysts (e.g., transition metal or potassium hydroxide) are added or when the reactive surface area of the iron-bearing water-reducing material is increased, e.g., grinding or use of sponge iron.

Other hydrogen production technologies include fossil fuel reforming which can be applied to a large range of hydrocarbon feedstocks, including natural gas, heavy oils, solid biomass and coal. It produces about 95% of today's hydrogen production. $CO_2$ is generated as by-product. Other methods include thermochemical water splitting using nuclear or solar energy and water electrolysis. These known methods exhibit drawback, they are either expensive, high energy consuming or produce greenhouse gases.

Furthermore, it was found that hydrogen produced by some of these methods may comprise impurities. If hydrogen is to be used in hydrogen fuel cells, high degree of purity is critical as even trace amounts of impurities present in the hydrogen can poison the anode, membrane, and cathode of the fuel cell resulting in performance drops.

These past years, new routes were investigated to produce hydrogen. It was proposed to produce hydrogen by thermochemical decomposition of water using steel slags. Water is sprayed on molten slags (1600-1700° C.) and a gas containing $H_2$ is produced. Although the proposed process offers a way to valorize steel slags, it produces hydrogen of low purity (only about 40% of $H_2$, the remaining being $CH_4$, $CO_2$, $N_2$ and CO) and may present safety risk as $H_2$ may explode at the working temperature. Furthermore, hydrogen produced by such a process may not be easy to collect and store.

Interest for steel slags as potential source of hydrogen is confirmed by a recently published study which deals with thermodynamic calculation of generation of hydrogen gas by reaction between FeO and water vapor (ISIJ International, Vol. 52, n°8, pp 1503-15212, 2012). In this study, the steel slags temperature ranges from 1600 to 1700° C. As indicated above, producing hydrogen at these high temperatures may present safety risks.

Steel slags are by-products of steelmaking and steel refining processes. They may be generated from basic-oxygen-furnace (BOF) or electric-arc-furnace (EAF) steel making industries. In average, 110 kg of steel slags per ton of steel are produced. Yearly steel slags production in France reaches 1.2 Mt. Half of this production is wasted as steel slags are not attractively valorized up to now. So far steel slags are mainly used as road ballast or as land filler.

Besides, magnetite, $Fe_3O_4$, is an oxide mineral rich in iron, of high density (5.1 g/cm$^3$), magnetic, which exhibits high hardness (5.5 to 6 on the Mohs scale) and high thermal conductivity (5 W/m·K). Apart from its possible oxidation, magnetite is relatively stable in the environment and without risk for health. All these properties make it a desirable mineral, first of all as a valuable iron ore. About 750 million tons are extracted annually to meet one third of the world's steel requirements (1.5 billion tons). Magnetite is also used for many other industrial applications such as ballasts, dense concrete, radiation protection materials or sludge treatment. For certain applications, such as paint pigments, toners, water treatment or ferrofluids, it is used in micrometric or nanometric form.

Magnetite of nanometric size is particularly sought after. It combines unique properties of superparamagnetism and surface reactivity which are only observed for nanoparticles, and not for other sizes of particles.

Grinding $Fe_3O_4$ mineral allows preparing particles of a few microns or even of the order of 500 nm at best, but does not allow achieving nanometric sizes.

Many methods of preparing magnetite are known, some from wüstite, but these methods generally lead to obtaining magnetite as micrometric or submicrometric size particles. The usual method for preparing nanometric particles of magnetite is via chemical synthesis from soluble iron (eg $FeCl_2$) [13,14], itself derived from the processing of steel waste with hydrochloric acid.

Therefore, there remains a need for a method that would allow:
producing high purity hydrogen at low cost without greenhouse gases emissions, and/or
preparing magnetite in the form of nanometric size particles, and
which could advantageously allow valorizing attractively steel slags.

SUMMARY OF THE INVENTION

The present invention relates to a method for producing hydrogen gas comprising the steps of:
(a) reacting a wüstite-containing material, such as steel slags containing wüstite, with $H_2O$ at a temperature ranging from 150° C. to 500° C.;
(b) cooling down the reaction product of step (a) to separate hydrogen gas from water steam;
(c) collecting hydrogen gas.

The invention also relates to a method for producing magnetite comprising the steps of:

(a') reacting a wüstite-containing material with water at a temperature ranging from 100 to 500° C. to obtain a solid product comprising magnetite, and then (b') recovering magnetite in the form of particles, wherein more than 25% by weight of the particles have a nanometric size.

Step (a') matches the definition of step (a) when the wüstite-containing material is steel slag containing wüstite and when the temperature ranges from 150° C. to 500° C. Hereafter, "step (a)/(a')" means that the embodiment may be applied to step (a) or (a').

The reaction of step (a)/(a') leads to reaction products in the form of a gaseous phase which comprises hydrogen, and in the form of a solid product comprising magnetite.

The invention also relates to a method for producing hydrogen gas and magnetite comprising steps (a), (b), (c) and (b'). Steps (b) and (b') may be implemented sequentially in any order or simultaneously.

FIGURES

Figure 8:
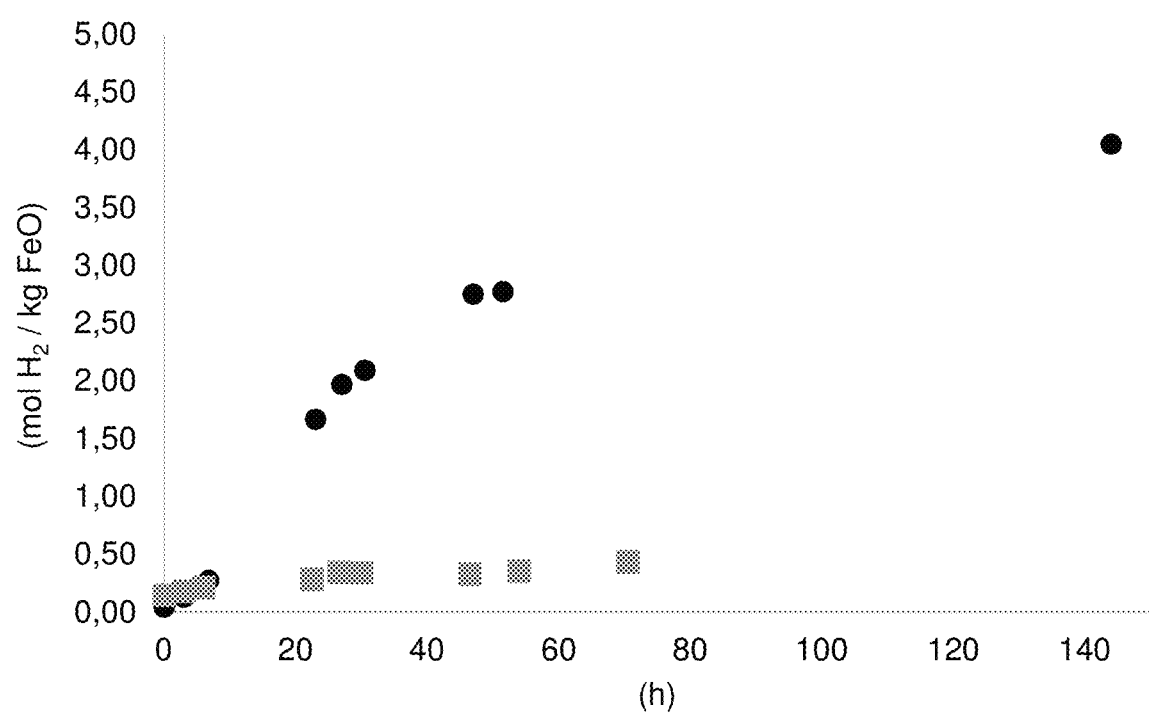

FIG. 8 shows the amount of produced hydrogen, normalized to the initial mass of ferrous oxide (FeO) in the samples (mol $H_2$/kg FeO), versus time in hours (h) for the steel slag used without pretreatment (squares) in water (experiment 33), or for steel slag previously decalcified by pretreatment with acetic acid solution and reacted in 1 mol/L acetic acid solution (round) (experiment 34) (Example 5).

DETAILED DESCRIPTION OF THE INVENTION

The inventors surprisingly found that production of high purity hydrogen gas may be achieved by a method comprising the steps of:

(a) reacting a wüstite-containing material, such as steel slags containing wüstite, with $H_2O$ at a temperature ranging from 150° C. to 500° C.;

(b) cooling down the reaction product of step (a) to separate hydrogen gas from water steam;

(c) collecting hydrogen gas.

Hydrogen gas produced by the method of the present invention exhibits a molar purity of at least 99.9%. In some embodiments, a molar purity of at least 99.995% may be achieved.

Moreover, the method for producing magnetite comprising the steps (a') and (b') as defined above allows preparing magnetite in the form of particles of micrometric and nanometric sizes. More than 25% by weight of the obtained particles are of nanometric size. In the present application, particle sizes correspond to their diameters determined by scanning electron microscopy (SEM), for example with a ZEISS ULTRA55 device, or transmission electron microscopy (TEM), for example with an JEOL-FEG 2100F device. By "nanometric" is meant less than 500 nm, preferably less than 250 nm. By "micrometric" is meant from 500 nm to 500 µm, preferably 1 to 200 µm.

The method comprises a step (a') of reacting at a temperature from 100 to 500° C., preferably from 150 to 500° C., a wüstite-containing material with water in order to obtain a solid product comprising magnetite.

The wüstite-containing material is typically in the form of grains having a size from 10 nm to 10 cm, typically 25 nm to 1 cm, for example 50 nm to 50 µm. The method may comprise, prior to step (a'), a step of grinding the wüstite-containing material, or being free thereof (the material being used in its original form).

The reaction of step (a') is generally carried out in a reactor. Contacting the material containing the wüstite and the aqueous solution may be carried out in the reactor, for example by introducing the wüstite-containing material before the aqueous solution into the reactor, or preferably before entry into the reactor. Typically, a suspension of wüstite-containing material in the aqueous solution is injected into the reactor, for example, by a fluidized bed.

The wüstite-containing material generally comprises at least 5% by weight, typically at least 10% by weight of wüstite (FeO) and up to 100% by weight.

In a preferred embodiment, the wüstite-containing material is a waste or a byproduct of steel industry, such as a steel slag, typically a basic-oxygen furnace (BOF) slag or an electric-arc-furnace (EAF) slag.

As indicated above, steel slags are by-products of steelmaking and steel refining processes. Typically, they contain at least 5 wt % of wüstite and may comprise up to 40 wt % of wüstite. In average, they contain from 10 to 20 wt % of wüstite. In this preferred embodiment, when the temperature of step (a') ranges from 150° C. to 500° C., step (a') matches step (a) defined above.

The method according to the invention advantageously allows preparing high added value nanomagnetite and/or high purity hydrogen from an abundant material, massproduced by the steel industry and currently essentially considered as a waste.

Steel slags may also comprise iron metal. When present, iron metal will advantageously contribute to the production of hydrogen.

Steel slags used in the method of the present invention have solidified upon cooling after they have been drawn off the furnace. They can therefore either be fresh slags with temperatures still around 500° C., partially cooled slags, generally having temperatures lower than 500° C. or they can be disposed steel slags at ambient temperature (15-25° C.). Thus, steel slags for use in the method of the present invention may have a temperature ranging from 15° C. to ca. 500° C. Using a fresh slag of partially cooled fresh slag is advantageous in that it is not required to warm the slag to the temperature of the reaction of step (a)/(a'). Even if the use of a disposed steel slags requires heating them to reach the temperatures required in step (a)/(a'), the method is still advantageous in that it makes it possible to add value to the stocks of disposed steel slags. Advantageously, steel slags used in the method of the present invention may be steel slags which have been disposed for days, weeks, months or even years in the open landfills, herein referred as "disposed steel slags".

Suitable steel slags for use in the method of the present invention include steel slags generated from basic-oxygen-furnace (BOF) or from electric-arc-furnace (EAF) steel making industries, referred herein as BOF steel slags or EAF steel slags. BOF steel slags or EAF steel slags may be disposed steel slags.

Other suitable steel slags include carbonated steel slags such as carbonated BOF slags or carbonated EAF slags.

The steel slag may be aged or not, this aging being natural or artificial.

Aging naturally steel slags consists in exposing them to weathering. Steel slag contains CaO (about 40% by weight). The combined action of moisture and of carbon dioxide present in the atmosphere gradually transforms the free lime into more stable compounds according to the following reactions:

Hydration reaction: $CaO+H_2O \rightarrow Ca(OH)_2$ 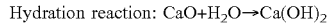

Carbonation reaction: $Ca(OH)_2+CO_2 \rightarrow CaCO_3+H_2O$ 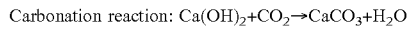

The steel slag used in the methods can be aged artificially. The method of the present invention may also comprise the step of carbonating steel slags prior to step (a)/(a'), i.e. a step of treating the steel slag with carbon dioxide ($CO_2$), for example as the method disclosed in [15]. Carbonation may be achieved by injecting $CO_2$ into the reactor. Carbonation allows to reduce pH and to sequester $CO_2$, advantageously, through mineral carbonation. On the other hand, produced $H_2$ is now mixed with $CO_2$, degrading drastically its purity.

Though carbonation is compatible with the method of the present invention, the inventors found that slags carbonation beforehand reduces the kinetics of hydrogen production at temperature below 400° C. (FIG. 1) and increases production of $CH_4$ (Table 1). Indeed, these carbonated materials produce $CH_4$ in concentrations by one to two orders of magnitude higher. The formation of $CH_4$ is due to the reaction between $H_2$ and $CO_2$ which occurs during the thermal breakdown of carbonates, in particular that of ferrous carbonates. However, hydrogen of lower purity is obtained (purity above 98%).

Besides, it has been observed that the carbonation step has little influence on the yield and size of magnetite obtained at the end of the method. Even if carbonating steel slags allows reducing the amount of CaO, which disadvantages the reaction in that it increases the pH of the aqueous solution, X-ray diffraction measurements have shown that part of the iron is sequestered in iron-bearing carbonates and is therefore no longer available to form magnetite.

Reaction of $H_2O$ with wüstite contained in the steel slags/wüstite-bearing material in the herein mentioned conditions induces oxidation of FeO and reduction of $H_2O$ according to the following reaction:

$3FeO+H_2O \Rightarrow Fe_3O_4+H_2$ 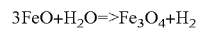

"Reacting with $H_2O$" as indicated herein means reacting with either liquid or vapor $H_2O$.

The reaction of step (a)/(a') of the method is carried out in the presence of water, generally in the presence of an aqueous solution.

As detailed hereafter, preferably, the pH of the aqueous solution is less than 7.

However, CaO-rich steel slags (e.g., BOF) drive the pH of water towards basic conditions. In that case, large amount of acid may be required to lower the pH of the aqueous solution below 7. In order to avoid having to use large amounts of acid, the steel slag used in step (a)/(a') can be decalcified (totally or partially). In order to decalcify the steel slag, the method may comprise, prior to step (a)/(a'), a step of contacting the steel slag with a decalcifying aqueous solution of pH from 1 to 6, generally from 2 to 5, typically a solution of acetic acid at a concentration of, for example, between 0.5 and 10 mol/L, whereby a mixture of the steel slag and of the decalcifying aqueous solution is obtained. Other types of acid could of course be used. The contacting is generally carried out at a temperature of 0 to 50° C., typically at ambient temperature (of the order of 25° C.) and preferably at atmospheric pressure (of the order of 1 bar). This prior decalcification step is straight forward and does not require specific skills. It allows minimizing the quantities of acid to be used in step (a)/(a'), when an aqueous solution having a pH of less than 7 is desired for implementing step (a)/(a'). In this respect, at the industrial level, it is easier, cheaper and more secure for the operators to add a pretreatment step with an acidic aqueous solution at ambient temperature and atmospheric pressure rather than carrying out the reaction of step (a)/(a'), which are generally carried out at high temperatures and pressure, with large amounts of acid.

Usually, after the step of contacting the steel slag with a decalcifying aqueous solution of pH from 1 to 6 and before step (a)/(a'), the method comprises a step of separating the decalcifying aqueous solution and the steel slag (for example by filtration or centrifugation). Indeed, generally, the decalcifying aqueous solution is not used to implement step (a)/(a'), since it comprises many dissolved species, in particular calcium.

The method may include, after the step of contacting of steel slag with an aqueous solution of pH 1 to 6 and prior to step (a)/(a'), a step consisting of adding $CO_2$ to the mixture of steel slag and of decalcifying aqueous solution, then a step consisting in separating the decalcifying aqueous solution from the steel slag. As the decalcifying aqueous solution is rich in dissolved calcium, adding $CO_2$ allows precipitating calcium carbonate and regenerating the original acid, and thus regenerating the decalcifying aqueous solution, which can then be reused to implement another decalcification step [16].

In another embodiment, the wüstite-containing material involved at step (a') is wüstite (FeO).

This embodiment allows obtaining the best kinetics for reaction of step (a'). However, it is not the most economical embodiment, since the FeO used as starting material is much more expensive than a steel slag. Moreover, magnetite yields (amount of produced magnetite by mass unit of FeO contained in the starting material) are similar to those obtained using a steel slag as the starting material.

Preferably, the surface area of the wüstite as measured by volumetric gas adsorption (e.g., $N_2$-BET method) is greater than 0.3 $m^2/g$.

In another embodiment, the wüstite-containing material involved at step (a') is a residue resulting from the production of the steel and the quenching of steel abrasives in the form of dust. These dusts are generally rich in FeO, typically they comprise more than 50% by weight of FeO.

The three embodiments described above are not limiting. Other materials containing FeO may be used at step (a'). Generally, in step (a)/(a'), the mass ratio of the wüstite contained in the wüstite-containing material with respect to water is from 1/0.1 to 1/1000, for example from 1/1 to 1/100.

Generally, the pressure during step (a)/(a') is from 5 to 700 bar, in particular from 10 to 400 bar, preferably from 40 to 200 bar. Step (a)/(a') may be carried out in liquid water under pressure. The working pressure is such that $H_2O$ partly remains in the liquid state at the working temperature (from 100 or 150° C. to 500° C.). The pressure has no substantial influence on the kinetics of hydrogen gas production. Alternatively, step (a)/(a') may be carried out in vapor phase. Preferably, pressure and temperature are such that water is not supercritical. Indeed, a method using supercritical water is generally more difficult to implement industrially.

The temperature during the reaction of step (a)/(a') is from 100 to 500° C., notably from 150 to 500° C., in particular from 150 to 350° C., for example from 150 to 250° C. Without wishing to be bound by any specific theory, an increase in temperature will enhance both the kinetics of FeO dissolution and the kinetics of FeO oxidation, thereby accelerating the conversion of the reaction.

The production of hydrogen gas increases with temperature and reaction duration. Indeed, temperature influences the kinetics of hydrogen production since step (a)/(a') is thermally activated. For instance, the production of hydrogen gas can be increased by a factor of three when carrying out step (a)/(a') at 400° C. instead of 250° C. However, temperature increase negatively impacts hydrogen purity. Indeed, the inventors found that, for carbonated slags, methane production is increased by one to two orders of magnitude when temperature is increased. The molar purity of hydrogen produced at 250° C. is higher than 99.995% whereas at 400° C., after water removal, the hydrogen molar purity is higher than 99.9%. Thus, when high-purity of hydrogen is particularly sought, step (a)/(a') may be carried out at a temperature preferably ranging from 150° C. to 350° C., more preferably from 200° C. to 300° C. When hydrogen purity is of less importance, step (a)/(a') may be carried out at a temperature preferably ranging from 360° C. to 500° C., more preferably from 400° C. to 450° C.

The reaction of step (a)/(a') uses water, preferably water or an aqueous solution, the pH of which is less than 7, when said aqueous solution is at 25° C. and at 1 bar.

In the sense of the application, the pH of the aqueous solution is the pH measured when the aqueous solution is at 25° C. and 1 bar (ambient temperature and atmospheric pressure), typically at the beginning of the reaction (t=0), i.e. when the wüstite-containing material and the aqueous solution are brought to the reaction temperature of from 100° C. or 150° C. to 500° C. The aqueous solution is in equilibrium with a steam-bearing gas phase at the reaction temperature and pressure, but when condensed at 25° C. and 1 bar, the pH of the solution is preferably less than 7. The pH plays an important role in the kinetics of the reaction of step (a)/(a'). Without wishing to be bound by any particular theory, acidity would favor the kinetics of FeO dissolution and would accelerate the conversion of the reaction. pH higher than 1 or even 2 are preferred. Indeed, most reaction vessels capable of sustaining high pressures are corroded by acidic solutions at high temperature. Reaction vessels that would resist both chemically and mechanically are expensive. Preferably, the pH of the aqueous solution is from 1 to 6, in particular from 2 to 5, typically from 2 to 4, for example from 2.5 to 3.

The aqueous solution is typically an aqueous solution of one or more acids. The person skilled in the art is able to adjust the pH, in particular by adding one or more acids. Various acids, organic, inorganic or acid mixtures, can be used. Mention may be made of hydrochloric acid as a usable inorganic acid. Organic acids comprising a group capable of complexing iron ions, such as a —COOH group, are preferred. Typically, oxalic acid, acetic acid or a mixture thereof are used. In particular, acetic acid is preferred because it can withstand high temperatures without degrading and it promotes the dissolution of the iron and thus the production of magnetite.

The amount of acid to be introduced for the aqueous solution to reach the targeted pH depends on the nature of the wüstite-containing material. For example, when this material is a steel slag containing CaO and/or $Ca(OH)_2$, larger amounts of acid are required for the pH of the aqueous solution to be lowered below 7, because these compounds neutralize the acid. When the wüstite-bearing starting-material contains acidic and/or basic compounds, or is free therefrom (especially wüstite or decalcified steel slag), an aqueous solution of acetic acid at a concentration of 0.01 to 10 mol/L, for example from 0.01 to 2 mol/L is appropriate.

It is possible to carry out step (a)/(a') with an aqueous solution with a pH higher than 7. In this case, it is generally necessary for the temperature in step (a)/(a') to be higher than 300° C. in order to improve the conversion.

Preferably, the reaction medium is stirred during step (a)/(a'), for example at a speed of 50 to 1000 rpm, which allows increasing the kinetics of the reaction of step (a)/(a'). Without wishing to be bound to a particular theory, stirring would favor the homogenization of the reaction medium and therefore enhance the kinetics of dissolution of FeO, which would accelerate the conversion of the reaction of step (a)/(a').

As mentioned above, the production of hydrogen gas increases with reaction duration. Step (a)/(a') duration may vary from a few hours when the reaction is carried out at high temperature to several days when the reaction is carried out at low temperature. It is within the abilities of a skilled person to adapt the reaction duration depending on the working temperature, the starting material and/or the desired production of hydrogen gas and/or of magnetite. In some embodiments, the material may be reacted with $H_2O$ for at least 1 hour or at least 5 hours or at least 10 hours or at least 24 hours. In some embodiments, the material may be reacted with $H_2O$ for up to 60 days. The duration of the reaction of step (a)/(a') is generally less than 70 hours, preferably less than 48 hours, for example less than 15 hours when it is carried out at a temperature around 150° C. and at a pressure ranging from 150 and 200 bar with an aqueous solution having a pH from 2 to 3. As explained above, the reaction is faster when the temperature is high and when the aqueous solution approaches the optimum pH range (2.5 to 3).

In one embodiment, the wüstite-containing material is wüstite, the pH (as defined above) of the aqueous solution is from 2 to 3, the pressure is 100 to 200 bar and the temperature is from 150 to 250° C.

In another embodiment, the wüstite-containing material is wüstite, the pH (as defined above) of the aqueous solution is from 5 to 7, the pressure is from 200 to 400 bar and the temperature is from 300 to 500° C.

In another embodiment, the wüstite-containing material is a steel slag which has not previously been decalcified, the pH (as defined above) of the aqueous solution is from 6 to 12, the pressure is from 200 to 400 bar and the temperature is from 250 to 350° C.

In another embodiment, the wüstite-containing material is a steel slag having previously been decalcified (preferably by contacting the steel slag with a decalcifying aqueous solution of pH from 2 to 6), the pH (as defined above) of the aqueous solution is from 3 to 4, the pressure is 100 to 200 bar and the temperature is 150 to 350° C., in particular 200 to 300° C.

The energy required to heat the wüstite-bearing $H_2$-producing material, in particular steel slags, from 25° C. to 150° C.-500° C. may be recycled from steelmaking or steel refining plants. Thus, advantageously, the method of the present invention will be carried out nearby a steelmaking or steel refining plant.

Prior to step (a)/(a'), the wüstite-containing material, such as steel slag containing wüstite, may be crushed, notably to increase $H_2$ production kinetics. For instance, particle sizes ranging from 10 nm to 100 μm, preferably from 10 nm to 50 μm obtained by crushing may increase $H_2$ production kinetics by a factor of 1.4 to 1.7. Nevertheless, crushing is not needed to achieve good yields of hydrogen gas production. Moreover, the grain size obtained after grinding/crushing the starting-material appears to have little or no influence on the kinetics of the reaction of step (a')/(a). Thus, preferably, the methods of the present invention do not comprise a crushing step.

In step (b), cooling down the reaction product of step (a)/(a'), i.e. the gas product of step (a)/(a'), preferably to room temperature, allows separation of $H_2$ gas from water steam which condensates. Thus, cooling the gas product of step (a)/(a') allows condensing water. The heat of the gases may be extracted through a thermal exchanger and re-used in the process (step (a)/(a') or in another process. Depending on wüstite-containing material quantity and temperature, the man skilled in the art will determine the appropriate process to manage the heat recovery. In another embodiment gases cool down slowly.

High-purity hydrogen is recovered after removing steam from the gas by condensation. The amount of produced hydrogen can be measured through magnetic measurements as production of hydrogen is proportional to the production of magnetite (see examples section: solid characterization) or by gas chromatography.

Magnetic measurement is a particularly preferred method for monitoring hydrogen production in a flow-through set-up. The magnetic measurement method comprises the steps of:

(i) collecting solid reaction product obtained after step (a)/(a'), in particular after reacting wüstite contained in steel slags, with $H_2O$ at a temperature ranging from 150° C. to 500° C.;

(i') optionally drying said solid reaction product, preferably in air at 80° C. for 48 hours;

(ii) measuring saturation magnetization (Js) of said solid reaction product;

(iii) applying a proportionality factor (92 $A \cdot m^2 \cdot kg$) to convert the Js measurement into a quantity of magnetite;

(iv) converting the calculated quantity of magnetite into quantity of hydrogen.

The invention also encompasses a method for monitoring hydrogen production as described herein above.

The conversion of the reaction can also be monitored by analyzing the production of hydrogen in the gas phase, for example by gas chromatography. A sample of gas phase can be collected using a reactor equipped with a gas sampling system.

Moreover, the method can comprise a step (b') consisting of recovering magnetite in the form of particles, wherein more than 25% by weight of the particles have a nanometric size.

The method can comprise, between steps (a)/(a') and (b'), a step of drying the solid product comprising the magnetite obtained at the end of step (a)/(a'), for example by placing it in hot air.

When the wüstite-containing material used as a starting material is wüstite, the solid product obtained at the end of step (a)/(a') mainly comprises magnetite, optionally residual wüstite, and optionally minor iron hydroxides, such as lepidocrocite and/or goethite. When the wüstite-containing material used as starting material comprises other compounds in addition to wüstite (typically for a steel slag), the recovery of step (b') is generally carried out by magnetic separation. Magnetic separation is performed by applying a magnetic field, which allows the extraction of magnetite along with iron-bearing oxides which are intimately associated with magnetite, e.g., FeO, (Fe,Mg)O and $Ca_2(Fe,Al)_2O_5$. Thus, the magnetic separation makes it possible to recover a fraction rich in magnetite which contains a minority of residual wüstite (with a weight proportion of magnetite generally higher than 80% of this fraction rich in magnetite).

The magnetic separation is usually carried out on a suspension of the solid product in the form of particles obtained at the end of step (a)/(a') in an aqueous solution, such as water and/or an acid solution, usually an aqueous solution the pH of which is less than 6, for example an aqueous solution of hydrochloric acid or acetic acid. Ultrasound may be applied to the slurry to facilitate the disintegration of the solid aggregates. Step (b') may therefore comprise grinding the solid product comprising the magnetite obtained at the end of step (a)/(a'), then preparing a suspension of the ground solid in an aqueous solution and then applying ultrasound to this suspension and then magnetic separation.

Step (b') may comprise several successive magnetic separation steps, during which the solid is suspended in identical or different aqueous solutions. Generally, step (b') then comprises the substeps of:

b'1) optionally grinding the solid product comprising the magnetite obtained at the end of step (a)/(a'), then b'2) adding water or an acid solution to the solid product comprising magnetite to obtain a mixture, b'3) magnetically separating the mixture of step b'2) to obtain a solid, b'4) adding water or an acid solution to the solid obtained at the end of step b'3) to obtain a mixture, b'5) magnetically separating the mixture from step b'4) to obtain the magnetite in the form of particles, wherein more than 25% by weight of the particles have a nanometric size.

Usually, grinding step b'1) is carried out when the wüstite-containing material used as starting material in the method has not been ground and has been used in its initial form. When, on the contrary, the wüstite-containing material used as a starting material in the method has been ground before carrying out step (a)/(a'), step b'1) is generally not implemented.

In steps b'2) and/or b'4), an acidic solution is preferably used, since any residual calcium carbonate dissolves in the acid solution and is therefore removed from the solid. When a steel slag is used as wüstite-containing material, the iron oxide concentration of the solid obtained at the end of step b'5) is generally higher than 90%, whereas it is 20% in the initial slag. The weight proportion of magnetite in the solid obtained at the end of step b'5) is at least 80%.

The invention relies on the unexpected discovery that the solid obtained at the end of step (b') comprises particles of magnetite of nanometric size. Indeed, hydrothermal methods at temperatures of the order of 200-300° C. often favor the crystalline growth and therefore obtaining particles with micrometric sizes.

The solid obtained at the end of step (b') generally contains magnetite in the form of particles with three populations of size:
from 10 to 20 nm,
from 100 to 200 nm,
of micrometric size, typically from 1 to 200 μm.

Such populations are generally obtained regardless of the wüstite-containing material used as a starting material (wüstite or steel slag). The proportion of each population can be determined, for example, by transmission electron microscopy and/or by laser particle size analysis. The weight proportions of nanomagnetite (i.e. the first two populations above) are higher than 25% relative to the total magnetite (i.e. the three populations above). The magnetite obtained at the end of step (b') therefore has superparamagnetism properties.

This magnetite can be used as it is in many applications, for example as a pigment (the advantage of magnetite is its resistance to weathering which makes the pigment suitable for outdoor use in paints, concrete, floor coverings, roads, tiles, glass), for the storage of heat due to its exceptional physical properties (specific heat, thermal conductivity and density), as a densifying agent for materials (for example for the preparation of dense concrete for protection against radiation or for the densification of plastics and rubbers), for the treatment of water (magnetite has chemically active surfaces for water treatment and can be recovered magnetically after treatment, it is therefore suitable for filtration, cleaning of sludges, water decontamination), as a source of iron in the chemistry (chloride, sulfate) for the treatment of the water in the treatment plants, as abrasive (not toxic and efficient) when used as a powder, in pressurized water jets for cutting, for catalysis in the ammonia and hydrocarbon industry, as iron ore for the iron and steel industry or as a fertilizing additive.

Some applications require the use of magnetite predominantly in the nanometric form, for example the use of magnetite in toners for printers and photocopiers, or as ferrofluids for high-tech applications: (medicine, hard disk joints, innovative shock absorbers for car, heat transfer . . . ).

Thus, after step (b'), the method may comprise a step (c') of separating the nanometric sized particles from the magnetite particles obtained at the end of step (b'). This separation may, for example, be carried out by a high gradient magnetic separator (HGMS). Typically, this step makes it possible to separate the particles of nanomagnetite from size from 10 to 20 nm of the rest of the magnetite [17]. Preferably, it allows separating each one of the three populations of particles of magnetite.

When a steel slag has been used as the wüstite-containing material, the by-product of the method is a solid stabilized silicate residue, which can be used, for example, as aggregates.

The method for producing hydrogen gas of the present invention may be carried out in batch or in continuous (also referred to as flow through). In a continuous or flow through method, $H_2$ gas may be extracted from the reactor as soon as produced.

Figure 1:
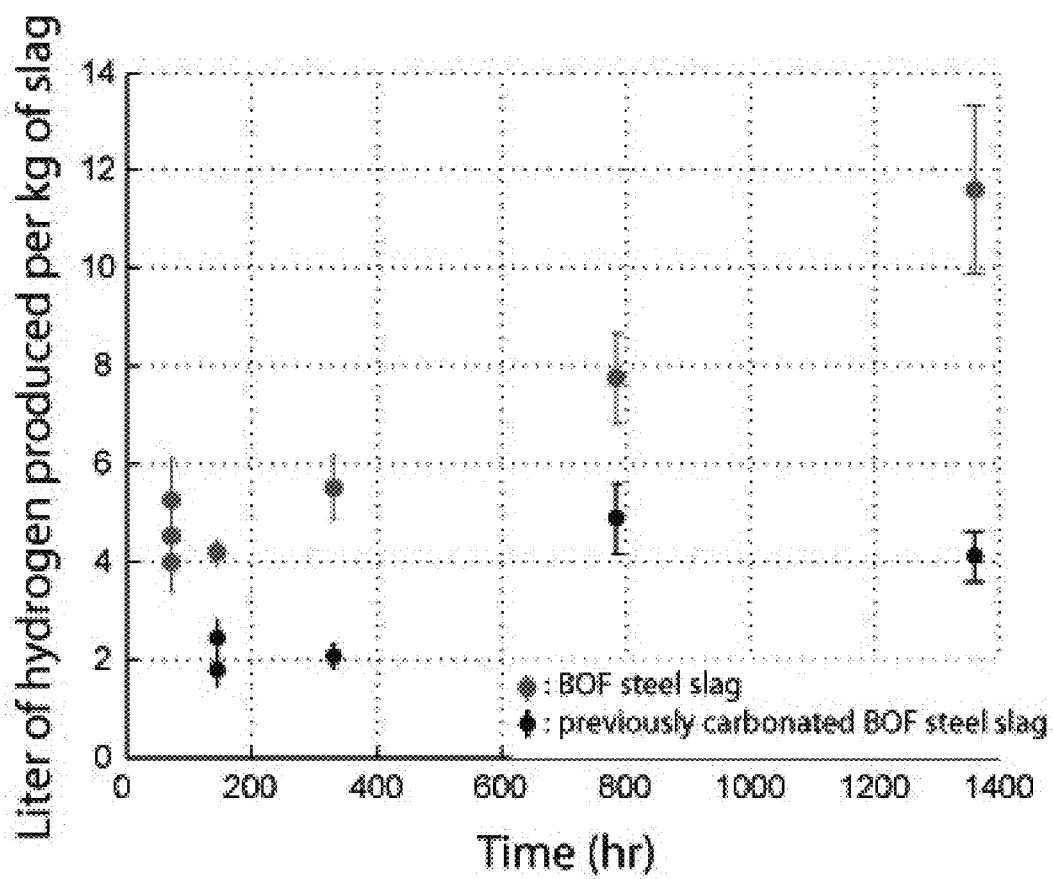
FIG. 1 represents hydrogen yield (NL/kg slag) as a function of time in experiments conducted at 250° C./500 bars by using either BOF steel slag or previously carbonated BOF steel slag (142 kg of $CO_2$ per ton of slag).

A method comprising the steps of:
(a) reacting steel slags with $H_2O$ at a temperature ranging from 150° C. to 500° C. for at least 10 hours;
(b) cooling down the reaction product of step (a) to separate hydrogen gas from water steam;
(c) collecting hydrogen gas;

allows producing up to 25 NL or 30 NL of $H_2$ per kg of slags. For instance, when BOF steel slags are reacted at 250° C., the method allows producing 5 NL of $H_2$ per kg of slag (FIG. 1). At 250° C. and after 70 h, the amount of conversion was found to be about 20 molar %. The amount of conversion reached 40-50 molar % for 1360 h at 250° C. and for 70 h at 400° C. Potentially, the reaction of all the ferrous iron contained in the BOF steel slag could produce 0.9 mole $H_2$ or 22 NL per kg.

In order to increase the production rate of hydrogen and/or magnetite, the reaction could be advantageously carried out in presence of a catalyst. Nevertheless, the reaction is typically performed without adding catalysts. Step (a)/(a') is simple and economical, in that it consists of a hydrothermal treatment, which uses only an aqueous solution, typically water and one or more acids. Generally, no metal in addition to those originally contained in the wüstite-containing material is added at step (a)/(a'). Typically, no material and/or compound other than the wüstite-containing material and the aqueous solution (which generally consists of an aqueous solution of one or more acids) is added to carry out the reaction of step (a)/(a').

The minimum energy required to heat the slag adiabatically from 25° C. to 250° C. is about 200 kJ/kg. This energy can be compared to the energy that can be recovered from the produced hydrogen at the same temperature (~0.2 mol/kg, i.e. 50 kJ/kg) which adds up with the latent heat of oxidation of FeO. Thus, the efficiency of the method of the present invention is of ca. 25% at 250° C. considering only the energy required for heating the slag. This efficiency falls in the range of other production methods which have typical efficiencies comprised between 9 and 85% with the highest efficiency attained with steam reforming. The efficiency can be improved if higher conversion is reached or if the heat associated with lime hydration (~300 kJ/kg of fresh slag) is recovered.

The annual worldwide production of BOF and EAF steel slags is over 47 Million tons. Considering a total conversion of these steel slags (0.9 mol (or 22 NL) of $H_2$ per kg), the method of the present invention has the potential for producing 85,000 tons of hydrogen per year. Nowadays, approximately 2% of the global hydrogen production (i.e. 2% of 69 Million tons per year [29]) is achieved according to processes which do not release $CO_2$ in the atmosphere (water electrolysis, thermochemical water splitting, thermocatalytic methane decomposition, . . . ). Consequently, the method of the present invention could supply 5-10% of the annual production of hydrogen produced without $CO_2$ emission or even with a negative $CO_2$ balance if slag carbonation is associated with this method.

The method of the present invention may be performed in a suitable reactor. The wüstite-containing material, such as steel slags containing wüstite, may be introduced in the reactor in the form of suspension (fluidized bed).

In the method of the present invention, steel slags, which are by-products of the steel industry, may be advantageously directly used for $H_2$ gas production, i.e., without grinding and without the addition of catalysts (e.g., transition metal-hydroxides). Furthermore, the method of the present invention allows producing hydrogen gas from disposed steel slags, such as landfill disposed steel slags. The thermal energy required to achieve $H_2$ production may be advantageously recycled from steelmaking or steel refining plants. The hydrogen production potential can be evaluated using a magnetic method.

Furthermore, hydrogen produced by the method of the present invention can be easily collected and stored. The partial pressure of the produced $H_2$ may avoid a compression stage for high pressure storage.

Advantageously, the by-products of the present method may be used as aggregates. Indeed, contrary to steel slags, the by-products of the present method no longer exhibit a propensity to expand.

EXAMPLES

Preparation of Crushed Basic Oxygen Furnace Steel Slag (CBOF)

A Basic Oxygen Furnace (BOF) steel slag was used as a starting material. The BOF steel slag was crushed for ten minutes in a mortar grinder (Retsch® RM100). A powder with a particle size ranging from below 10 nm to 50 μm was obtained, referred to herein as CBOF. The particle size was inferred from SEM observations.

Major and minor element composition and iron speciation were determined by ICP-OES, X-ray diffraction, SEM and EXAFS ([1], [2], [3], [4]).

The major element composition of the BOF slag is: CaO (44.7 wt. %), FeO (20.58 wt. %), $Fe_2O_3$ (3.16 wt. %), Fe (2.7 wt. %), $SiO_2$ (7.6 wt. %), MnO (2.86 wt. %), MgO (4.9 wt. %), $Al_2O_3$ (1.2 wt. %) and $P_2O_5$ (1.61 wt. %).

Preparation of Carbonated Crushed Basic Oxygen Furnace Steel Slag (CARBOF)

The steel slag was reacted with $CO_2$ following the procedure described in [5].

Twenty grams of the crushed steel slag (CBOF) were loaded in a 2 L hastelloy PARR® autoclave together with 1 L of de-ionized water (resistivity of 18.2 MΩ·cm). The experiment was conducted at room temperature (23±1° C.) for 6 days under constant stirring. After dispersion of the BOF steel slag into water, $CO_2$ was injected in the reactor to reach an initial pressure of twenty bars.

Production of Hydrogen 32 experiments were carried out (see Table 1).

BOF slag (BOF), crushed BOF slag (CBOF) or carbonated BOF slag (CARBOF, containing up to 142±2 $CO_2$ g/kg) powders were loaded in 2 to 3 centimeters length gold tube (4.0 mm outer diameter and 3.6 mm inner diameter) with de-ionized water (resistivity of 18.2 MΩ·cm) in a water to solid mass ratio ranging from 0.15 to 5.6. The capsules were welded shut and placed in horizontal cold-seal pressure vessels. Run temperatures, ranging from 200 to 400° C., were measured with a Ni—NiCr thermocouple and regulated to within 1° C. (see [6]). A pressure of 50 MPa was applied to all experiments by pumping either argon or water into the vessel. The experiments were finally quenched and both gas and solid analyzed.

$H_2$ was produced in all experiments. Up to 0.42 and 0.32 mole of $H_2$ per kg of reactant was produced in COLAC8 and COLAC12 at 523 and 673 K for 1362 and 43 h, respectively. $CH_4$ was detected in all CARBOF experiments but COL-ACE116, with an average molar $CH_4/H_2$ ratio of ca. 0.016.

Figure 2:
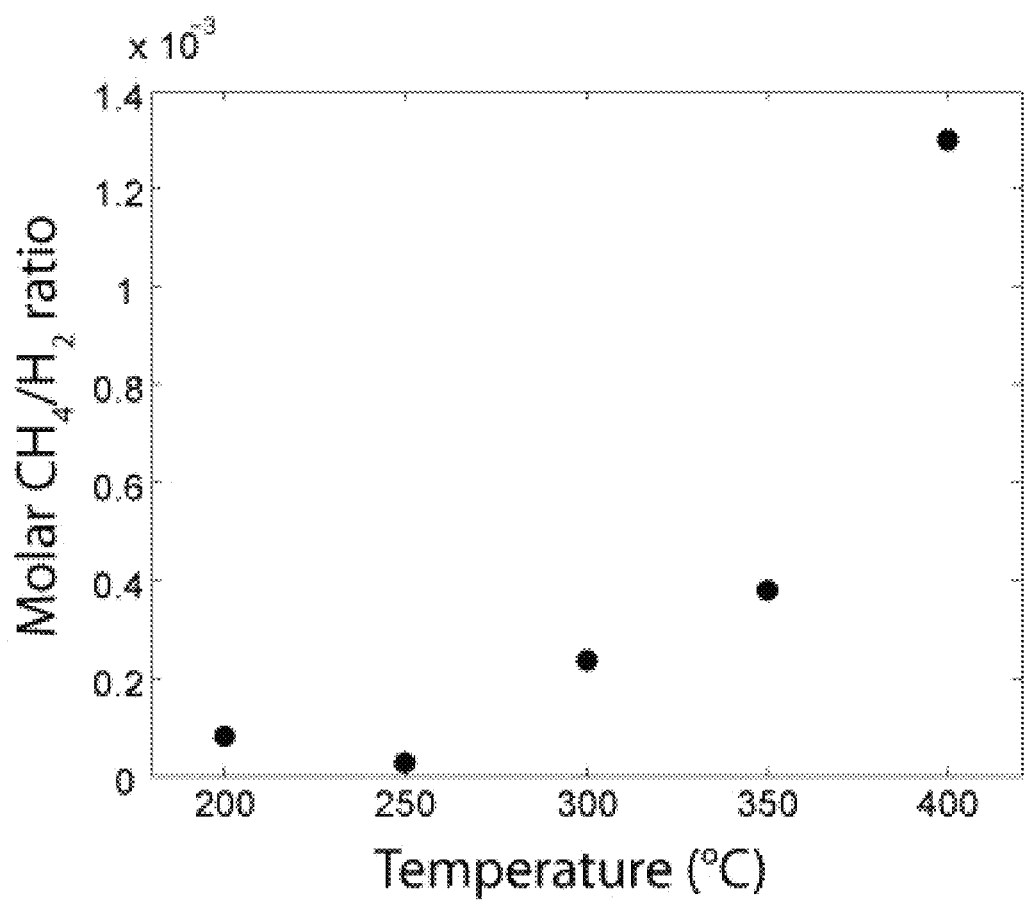
FIG. 2 represents the average $CH_4/H_2$ ratio as a function of temperature in experiments using carbonated BOF powder as starting material.

In BOF and CBOF, $CH_4$ production is one to two orders of magnitude lower and the averaged $CH_4/H_2$ ratio increases from $7.10^{-5}$ at 200° C. to $1.3.10^{-3}$ at 400° C. (FIG. 2). Concentrations of $CO_2$ close to the detection limit of the GC were also detected in one CBOF experiment and in three CARBOF experiments (Table 1).

Figure 3:
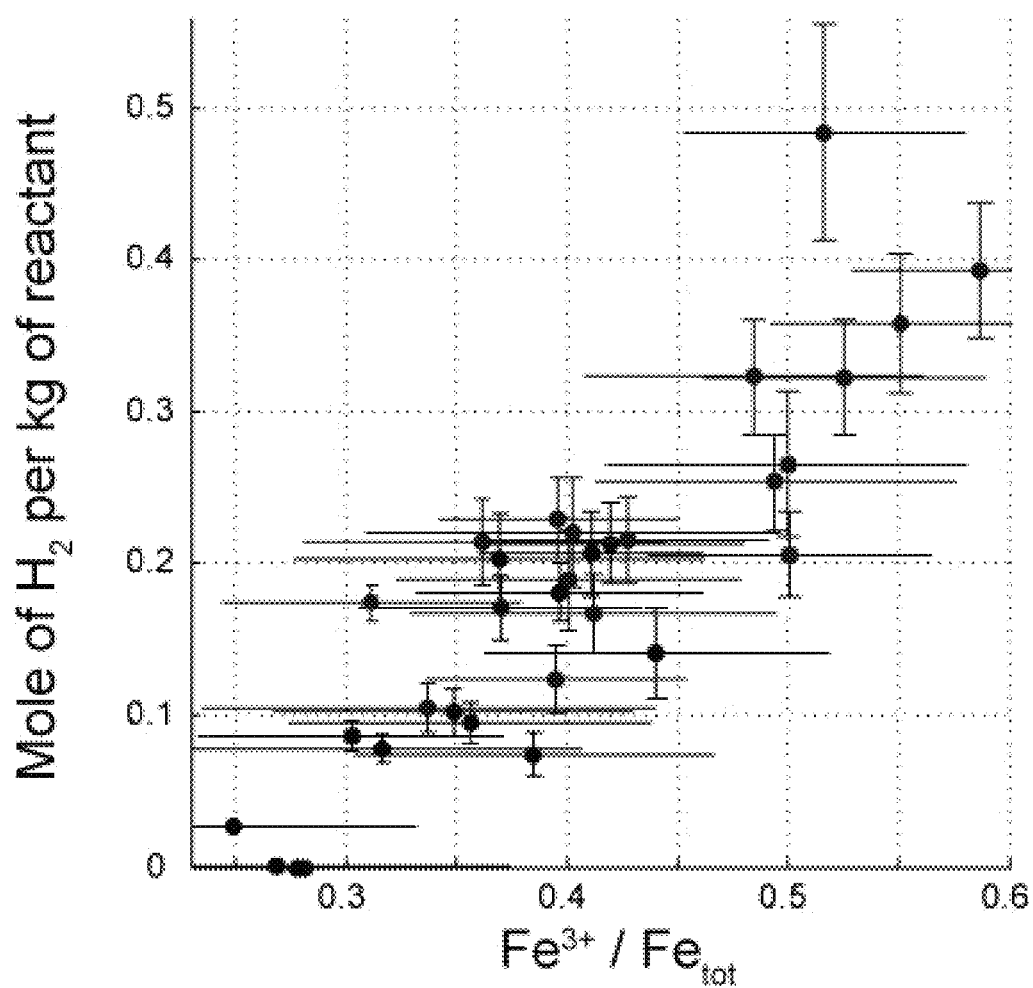
FIG. 3 represents the relationship between the quantity of produced hydrogen and the $Fe^{3+}/Fe_{tot}$ ratio derived from Rietveld analysis in the experimental products.

FIG. 3 shows that hydrogen production is clearly correlated to the increase of $Fe^{3+}$ proportion in the powder. The main $Fe^{3+}$-bearing phase that was produced during the experiments is magnetite which can be precisely quantified by magnetic measurements according to the method described herein below.

Magnetite was mainly produced through the oxidation of wüstite. One mole of hydrogen should be produced per mole of magnetite. This mass balance relationship is verified in all experiments, i.e. either BOF/CBOF or CARBOF. $H_2$ production results directly from the oxidation of wüstite.

TABLE 1

| Run n° | Reactant | M reactant mg | M water mg | Temperature K | Duration hr | Jrs/Js | Hcr/Hc | Js μA·m2 | M magnetite wt. % | $H_2$ MAG mol/kg | $H_2$ GC mol/kg | $CH_4$ $10^{-4}$ mol/kg | $CO_2$ |
|---|---|---|---|---|---|---|---|---|---|---|---|---|---|
| Initial Powder | CBOF | | | | | 0.050 | 7.14 | | 2.21 | | | | |
| COLAC2 | CBOF | 74.2 | 80.4 | 573 | 162.7 | 0.219 | 2.09 | 436.9 | 11.25 | 0.362 | 0.358 | 0.705 | X |
| COLAC3 | CBOF | 102.6 | 20.0 | 573 | 216.0 | 0.235 | 1.96 | 556.6 | 13.29 | 0.450 | 0.393 | 1.470 | |
| COLAC4 | CBOF | 84.8 | 40.3 | 523 | 70.4 | 0.183 | 2.60 | 291.2 | 7.32 | 0.192 | 0.167 | n.d. | |
| COLAC5 | CBOF | 77.6 | 80.7 | 523 | 70.4 | 0.178 | 2.68 | 281.8 | 6.48 | 0.156 | 0.189 | n.d. | |
| COLAC6 | CBOF | 47.9 | 119.6 | 523 | 70.4 | 0.176 | 2.61 | 205.7 | 7.06 | 0.181 | 0.220 | n.d. | |
| COLAC7 | CBOF | 41.6 | 231.3 | 523 | 142.8 | 0.171 | 2.63 | 208.5 | 7.69 | 0.208 | 0.174 | n.d. | |
| COLAC8 | CBOF | 81.9 | 80.6 | 523 | 1362.0 | 0.200 | 2.19 | 412.0 | 12.5 | 0.416 | 0.484 | n.d. | |
| COLAC9 | CBOF | 81.4 | 80.5 | 523 | 329.3 | 0.159 | 2.70 | 511.9 | 9.01 | 0.265 | 0.229 | n.d. | |
| COLAC10 | CBOF | 81.6 | 80.3 | 623 | 65.3 | 0.213 | 2.09 | 439.8 | 10.9 | 0.346 | 0.254 | 0.962 | |
| COLAC11 | CBOF | 85.9 | 80.6 | 473 | 497.0 | 0.178 | 3.01 | 223.9 | 5.59 | 0.117 | 0.214 | n.d. | |
| COLAC12 | CBOF | 94.0 | 80.4 | 673 | 43.2 | 0.213 | 2.26 | 497.0 | 9.77 | 0.298 | 0.323 | 5.342 | |
| COLAC14 | CBOF | 83.6 | 80.7 | 523 | 785.7 | 0.218 | 2.20 | 481.8 | 9.54 | 0.288 | 0.323 | 0.717 | |
| COLAC15 | CBOF | 81.1 | 80.3 | 573 | 66.0 | 0.189 | 2.47 | 238.9 | 7.59 | 0.203 | 0.215 | 0.296 | |
| COLAC17 | CBOF | 81.1 | 81.0 | 473 | 69.2 | 0.098 | 4.10 | 237.9 | 5.49 | 0.113 | 0.105 | 0.167 | |

TABLE 1-continued

| Run n° | Reactant | M reactant mg | M water mg | Temperature K | Duration hr | Jrs/Js | Hcr/Hc | Js μA·m2 | M magnetite wt. % | H$_2$ MAG mol/kg | H$_2$ GC mol/kg | CH$_4$ 10$^{-4}$ mol/kg | CO$_2$ |
|---|---|---|---|---|---|---|---|---|---|---|---|---|---|
| COLAC18 | CBOF | 80.6 | 80.4 | 673 | 68.3 | 0.224 | 2.14 | 420.0 | 10.10 | 0.312 | 0.265 | 3.376 | |
| OL2C1 | BOF | 81.33 | 80.62 | 673 | 68.3 | 0.249 | 1.99 | 307.0 | 8.17 | 0.229 | 0.124 | 1.242 | |
| OL2C2 | BOF | 86 | 80.2 | 523 | 690.1 | 0.250 | 2.11 | 275.8 | 5.46 | 0.111 | 0.206 | n.d. | |
| Initial Powder | CARBOF | | | | | 0.064 | 5.74 | | 1.28 | | | | |
| COLACE11 | CARBOF | 95.49 | 14.98 | 473 | 167.6 | 0.156 | 2.49 | 274.5 | 5.39 | 0.023 | 0.027 | 3.399 | X |
| COLACE12 | CARBOF | 63.33 | 60.27 | 573 | 141.1 | 0.222 | 2.12 | 234.8 | 9.73 | 0.210 | 0.141 | 3.059 | X |
| COLACE14 | CARBOF | 40.93 | 110.9 | 523 | 142.8 | 0.200 | 2.21 | 175.9 | 7.60 | 0.118 | 0.102 | 1.753 | |
| COLACE16 | CARBOF | 78.45 | 40.06 | 523 | 142.8 | 0.198 | 2.26 | 354.1 | 6.68 | 0.079 | 0.074 | 1.489 | |
| COLACE17 | CARBOF | 79.1 | 80.03 | 523 | 1362.0 | 0.201 | 2.27 | 359.0 | 8.91 | 0.175 | 0.171 | 1.663 | |
| COLACE18 | CARBOF | 81.12 | 80.29 | 523 | 329.3 | 0.169 | 2.52 | 357.4 | 7.65 | 0.121 | 0.086 | 1.391 | |
| COLACE19 | CARBOF | 80.12 | 80.3 | 623 | 65.3 | 0.214 | 2.16 | 450.1 | 9.07 | 0.182 | 0.181 | 2.137 | |
| COLACE110 | CARBOF | 79.65 | 80.59 | 473 | 497.0 | 0.179 | 2.54 | 287.9 | 6.22 | 0.059 | 0.078 | 0.890 | |
| COLACE111 | CARBOF | 80.17 | 80.31 | 673 | 43.2 | 0.221 | 2.33 | 456.1 | 9.67 | 0.208 | 0.213 | 6.025 | |
| COLACE112 | CARBOF | 80.96 | 80.11 | 523 | 785.7 | 0.205 | 2.31 | 326.1 | 7.54 | 0.116 | 0.203 | 1.981 | |
| COLACE114 | CARBOF | 82.48 | 80.32 | 573 | 66.0 | 0.198 | 2.38 | 272.2 | 7.37 | 0.118 | 0.095 | 0.830 | |
| COLACE115 | CARBOF | 84.02 | 80.25 | 673 | 66.2 | 0.200 | 2.31 | 535.9 | 12.95 | 0.349 | 0.206 | 3.860 | X |
| COLACE116 | CARBOF | 82.26 | 80.2 | 473 | 69.2 | 0.118 | 3.17 | 164.6 | 4.02 | 0.000 | 0.001 | n.d. | |

M reactant, initial mass of reactant;
M water, initial mass of water;
Jrs, saturation remanent magnetization;
Js, saturation magnetization;
Hcr, remanent coercivity;
Hc, intrinsic coercivity;
M magnetite, total mass of produced magnetite;
H$_2$ MAG, amount of hydrogen produced deduced from the magnetic measurement;
H$_2$ GC, amount of hydrogen produced deduced from gas chromatography;
CH$_4$, amount of methane produced deduced from gas chromatography measurement;
CO$_2$, detection of carbon dioxide with gas chromatography.

GC Analysis

Gas sampling for gas chromatography (GC) analysis was achieved by placing the gold capsule in a syringe equipped with an indenter and a three-way tap. A Clarus 500 gas chromatograph (PerkinElmer®) equipped with a thermal conductivity detector was used. The syringe was filled with the same gas as the gas carrier of the GC (Ar, 99.995%). Before piercing the capsule, a blank measurement was carried out on Ar injected in the syringe.

Then, the capsule was pierced and the experimental gas produced released in the syringe. The gas mixture (argon+ sampled gas) was sampled through the septum placed on one way of the tap and analyzed by GC. This latter procedure was repeated three times to verify the homogeneity of the gas mixture and the reproducibility of the measurement. The gas purity (volume proportion) is calculated as H$_2$/(H$_2$+CO+ CO$_2$+CH$_4$), i.e; the only gases produced in the experiments that are observed with the GC.

Solid Characterization

The recovered solid products were first dried for 48 h in air at 80° C. The X-ray patterns were analyzed with Rietveld using the BGMN software ([7]). Portlandite, magnetite, wüstite, calcite, lime and α-ferrite were refined using the internal structure database of BGMN whereas the crystal structures given by [8], [9] and [10] were used for larnite, brownmillerite and hibschite, respectively.

The amount of magnetite produced by ferrous iron oxidation was estimated from the saturation magnetization (Js) of the sample ([11]). Js was measured using a Princeton Micromag Vibrating Sample Magnetometer 3900 at IPGP, Paris. A proportionality factor of 92 A·m$^2$/kg was used to convert the Js signal into a quantity of magnetite ([12]).

Example 2: Preparation of Magnetite from Wüstite

Wüstite (FeO 99.9%, Aldrich) was ground and sieved to a size particles ranging from 50 to 100 μm and a specific surface area measured by N$_2$-BET (Belsorp-Max device provided by BEL JAPAN Inc.) of 0.70 m$^2$/g. The iron oxidation state in the starting material, quantified by Mössbauer spectroscopy (Ortec trademark) was 91.6% Fe$^{2+}$, 5.6% Fe$^{3+}$ and 2.8% FeO. The average iron oxidation state corresponds to pure Fe (II), in accordance with the grade of FeO used.

For experiments 1 to 3, the wüstite was used without previous grinding. For other experiments, it was ground (50-100 μm)

The aqueous solutions were aqueous solutions of acetic acid, oxalic acid or hydrochloric acid in the concentrations and pH indicated in Table 2, or water.

Experiments 1 to 19 were made in 2 cm long, 4.0 mm outer diameter and 3.6 mm internal diameter gold capsules. 80 mg of wüstite and of the aqueous solution were introduced into it with a weight ratio of 1/1. The closed capsule was introduced into a pressure reactor, said reactor being introduced into a furnace. Temperatures of 100 to 200° C. at an argon pressure of 300 bars were used. At the end of the experiment, a flow of compressed air was used to reduce temperature and pressure under isochoric conditions. The gaseous phase produced by the sample was recovered for analysis.

Experiments 20-22 were carried out in a 500 ml in Hastelloy™ autoclave provided with two ceramic-based external heaters for heating. The reaction mixture was stirred at 800 rpm. This autoclave allows the real time monitoring of hydrogen production, and thus of the reaction conversion. The gas phase sample, which was collected under high pressure and temperature, was condensed in a condenser with cold water and then analyzed by gas chromatography. Solution samples were also taken through a capillary and filtered through a titanium filter with pore sizes of 0.2 μm and then analyzed by optical emission spectrometry with inductively coupled plasma (ICP-OES) (Varian 720ES). The experiments were carried out with a weight ratio FeO/water of 1/200.

The components of the gas phase ($H_2$, $CO_2$, $N_2$, $O_2$, CO, $CH_4$) were analyzed with a Clarus 500 (Perkin Elmer®) gas chromatograph provided with a polymer column (Restek ShinCarbon®) and a thermal conductivity detector (TCD). The temperature of the detector, the injection system and the furnace were respectively 250, 100 and 80° C. Argon was the eluent gas. Each gas sample was analyzed at least three times. As regards the experiments 1 to 21 conducted in the capsules, it was considered that all of the $H_2$ is in the gas phase obtained after piercing the capsule. As regards the experiments 20 to 22 conducted in the autoclave, the composition of $H_2$ in the gas samples was determined by taking into account the proportion of $H_2$ in the gas phase and in the aqueous medium.

The proportion of iron in the aqueous solution was evaluated immediately after collecting 2 ml samples of the aqueous solution by UV spectroscopy after complexation with orthophenantroline. Stored in the refrigerator, all samples were analyzed again by ICP-OES.

when acetic acid was used, the hydrogen proportion is much greater at pH 2.5 or 3 than at pH 3.5. Optimum conditions appear to be achieved at these temperatures and pressure for a pH of 3. Thus, conversion into hydrogen is very different at pH 3.5 or 3 (respectively 1 or 28%), but is of the same order of magnitude at pH 3 or 2.5 (28 and 21%).

The results of experiments 7 to 17, in which an aqueous solution of acetic acid at pH 3 was applied using a pressure of 300 bar, show that, for the same reaction time, the conversion of the reaction increases with temperature.

This observation is similar when water is used as aqueous solution: hydrogen conversion is 3% at 150° C. (experiment 21), and 23% at 300° C. (experiment 22), i.e. 9 times more.

Hydrogen production was followed over time in water at pH 6 at two different reaction temperatures (150 and 300° C.) (experiments 21 and 22).

At 150° C. (experiment 21), $H_2$ was produced only in the first 10 hours of reaction and in a proportion corresponding to 3% conversion. Small amounts of magnetite were identified by XRPD among residual FeO. From 10 h to 65 h reaction time, no $H_2$ was produced.

TABLE 2

Conditions of the experiments with wüstite as starting material and proportion of produced $H_2$.

| Exp. | Acid | c° (mol/L) | T (° C.) | P (bar) | Time (h) | pH | g $H_2$/kg FeO (g/kg)* | conversion |
|---|---|---|---|---|---|---|---|---|
| 1 | MeCOOH | 0.05 | 150 | 300 | 240 | 3 | 2.62 | 28% |
| 2 | oxalic acid | 0.001 | 150 | 300 | 240 | 3 | 0.24 | 3% |
| 3 | HCl | 0.001 | 150 | 300 | 240 | 3 | 0.20 | 2% |
| 4 | MeCOOH | 0.005 | 150 | 300 | 72 | 3.5 | 0.074 | 1% |
| 5 | MeCOOH | 0.05 | 150 | 300 | 72 | 3 | 2.58 | 28% |
| 6 | MeCOOH | 0.5 | 150 | 300 | 72 | 2.5 | 1.91 | 21% |
| 7 | MeCOOH | 0.05 | 100 | 300 | 72 | 3 | 0.058 | <1% |
| 8 | MeCOOH | 0.05 | 200 | 300 | 72 | 3 | 5.34 | 58% |
| 9 | MeCOOH | 0.05 | 150 | 300 | 24 | 3 | 1.34 | 14% |
| 10 | MeCOOH | 0.05 | 150 | 300 | 3 | 3 | 0.068 | <1% |
| 11 | MeCOOH | 0.05 | 150 | 300 | 168 | 3 | 4.08 | 44% |
| 12 | MeCOOH | 0.05 | 150 | 300 | 72 | 3 | 2.46 | 27% |
| 13 | MeCOOH | 0.05 | 150 | 300 | 8 | 3 | 0.30 | 3% |
| 14 | MeCOOH | 0.05 | 100 | 300 | 172 | 3 | 0.23 | 2% |
| 14 | MeCOOH | 0.05 | 200 | 300 | 24 | 3 | 3.74 | 40% |
| 16 | MeCOOH | 0.05 | 200 | 300 | 3 | 3 | 2.86 | 31% |
| 17 | MeCOOH | 0.05 | 200 | 300 | 48 | 3 | 3.26 | 35% |
| 18 | HCl | 0.001 | 150 | 300 | 72 | 3 | 0.084 | <1% |
| 19 | HCl | 0.001 | 200 | 300 | 72 | 3 | 0.19 | 2% |
| 20 | MeCOOH | 0.05 | 150 | 160 | 48 | 3 | 8.06 | 87%*** |
| 21 | Water | — | 150 | 150 | 64.5 | 6 | 0.26 | ***3% |
| 22 | Water | — | 300 | 180 | 144 | 6 | 2.18 | 23%*** | c° = acid concentration,
T = temperature,
P = pressure
*Mass of produced $H_2$ measured by gas chromatography divided by the initial mass of wüstite-containing material
**Conversion calculated from the mass of produced $H_2$
***The conversion differences in the capsules (Experiments 1 to 19) or in the autoclave (Experiments 20 to 22) for similar conditions of pressure, temperature and nature of aqueous solution could be explained by the important FeO/aqueous solution ratio difference (1/200 autoclave and 1/1 in capsules) and/or by the almost total absence of gas in the experiments in capsules and/or by the absence of stirring in the reaction medium of the capsules.

The conversion of the reaction of step (a) of the method (last column of Table 2) was calculated by analyzing the amounts of hydrogen (second-last column of Table 2), which are directly correlated with those magnetite.

Influence of the Nature of the Acid on the Conversion

Comparing the results of Experiments 1, 2 and 3 shows that, at 150° C. and 300 bar, the hydrogen proportion is 10 times higher when acetic acid was used instead of hydrochloric acid or oxalic acid.

Influence of pH and Temperature on the Conversion

Comparison of the results of Experiments 4, 5 and 6 shows that, at a temperature of 150° C. and 300 bar and At 300° C. (experiment 22), in the first 10 hours of the reaction, the kinetics of production of hydrogen was four times greater than at 150° C. Unlike the experiment at 150° C., $H_2$ was still produced after 10 hours of reaction, at a production rate decreasing gradually with time. After 144 hours, a conversion of 23% was obtained.

It is therefore possible to perform the reaction at pH 6, but it is appropriate to use higher temperatures than those needed at pH 3. Comparing the results of experiments 20 and 21 shows that the reaction conversion is greatly influenced by the presence of acetic acid. At 150° C., when the aqueous solution is water, FeO did almost not react at all (experiment 21), whereas when the aqueous solution is an aqueous solution containing 0.05 mol/L of acid acetic at pH 3, conversion was nearly complete within 10 hours.

Comparing experiments 20 and 22 shows that, in order to increase the kinetics of the reaction, using an acidic aqueous solution is much more advantageous than increasing the temperature.

The solid product obtained at the end of reactions was washed several times with water, ground and then analyzed by X-ray powder diffraction (XRPD). The diffractograms were obtained with a D8 diffractometer (Bruker, CuKα radiation) (scanning in 2θ at 0.026°, 8 s).

A portion of the solid was kept unground for electron microscopy analysis, Field Emission Scanning Electron Microscopy (FE-SEM) (ZEISS Ultra 55 device using both detection of secondary electrons and back dispersion of electrons) and electronic transmission microscopy (TEM) (JEOL 2100F FEG device used at 200 kV). Both devices were provided with an Energy-Dispersive X-ray spectroscopy (EDS) detector for chemical analysis. For FE-SEM analysis, before the Au—Pd plating, the sample was either mounted on a double sided carbon-based adhesive or embedded within an epoxy resin and polished. For TEM analysis, a drop of the sample in powder form was dispersed within ethanol and deposited on a Lacey type carbon covered grid.

The observation of the solids obtained by FE-SEM helped distinguishing wüstite and magnetite. FeO, with higher average atomic number, led to a higher flow of backscattered electrons than the one resulting from magnetite.

At the micron scale, the FE-SEM figures of the solid collected from the autoclave in experiments 21 and 22 show that the oxidation of FeO to magnetite is mainly localized in channels which are homogeneously distributed within the grains. The magnetite seems to nucleate at structural defects or cracks. The magnetite may form by a process of self-oxidation of FeO. Whatever the oxidation process which takes place, the formation of the magnetite inside grain suggests that the kinetic of the reaction may not be proportional to the surface area of FeO used as starting material. In other words, grinding FeO grains in order to reduce their sizes should not increase significantly the reaction kinetics.

Figure 4:
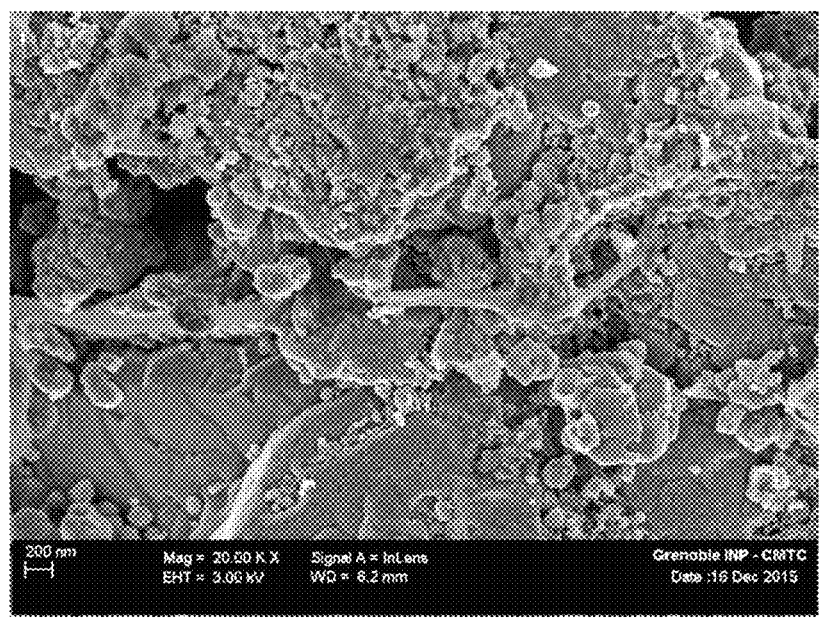
FIG. 4 is an image obtained by FE-SEM (ZEISS Ultra 55 device, using secondary electron detection) of the solid product recovered at the end of experiment No. 20 of Example 2 with a magnification of 20,000 (reference of polaroid type).
Figure 6:
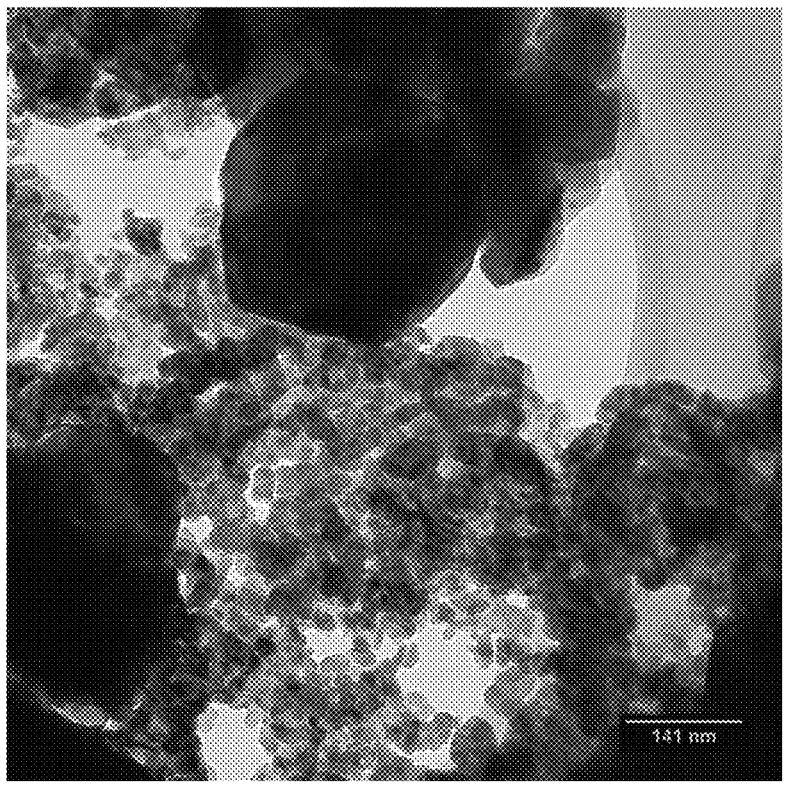
FIG. 6 is an image obtained by Transmission Electronic Microscopy (TEM) (Jeol FEG 2100F device, used at 200 kV) of the solid product obtained at the end of experiment No. 20 of Example 2.

Combined analysis of FE-SEM (FIG. 4, experiment No. 20) and TEM pictures (FIG. 6, Experiment No. 20) allowed estimating the populations and distributions of produced magnetite particles. The obtained solid contains magnetite in particulate form with three populations size:
From 10 to 20 nm,
From 100 to 200 nm,
Of micrometer size.

Analytical techniques and devices described in Example 2 were used in all the following examples.

Example 3: Preparation of Magnetite from a Wüstite/CaO Mixture

In order to simulate the behavior of wüstite in steel slag, wherein CaO is a major component, experiments were performed in gold capsules on wüstite/CaO mixtures.

TABLE 3

Conditions of experiments from a wüstite/CaO mixture and proportions of produced hydrogen.

| Exp. | material | Acid | c° (mol/L) | pH | T (° C.) | P (bar) | Time (h) | g H$_2$/kg FeO— (g/kg) |
|---|---|---|---|---|---|---|---|---|
| 23 | FeO/Ca(OH)$_2$: 1/1* | MeCOOH | 0.05 | 9.1 | 150 | 300 | 72 | 0.00051 |
| 24 | FeO/CaCO$_3$: 1/1* | MeCOOH | 0.05 | 5.8 | 150 | 300 | 72 | 0.051 |
| 25 | FeO (control) | Water | 0.05 | 3.0 | 150 | 300 | 72 | 2.47 | c° = acid concentration,
T = temperature,
P = pressure
*weight ratios

The results shown in Table 3 show that adding CaO, whether in the form of Ca(OH)$_2$ or CaCO$_3$, inhibits the reaction. This could in particular be explained by the pH increase induced by these compounds.

Example 4: Preparation of Magnetite from Steel Slag

Experiments were carried out on BOF type steel slag collected at Fos sur Mer. This slag has been submitted to a two-week aging in air there.

TABLE 4

Conditions of experiments from steel slags.

| Exp. | material | Acid | c° (mol/L) | T (° C.) | P (bar) | Time (h) |
|---|---|---|---|---|---|---|
| 26 | Slag | MeCOOH | 2 | 150 | 300 | 72 |
| 27 | Slag | MeCOOH | 4 | 150 | 300 | 72 |
| 28 | Slag | MeCOOH | 2 | 300 | 300 | 72 |
| 29 | Slag | MeCOOH | 4 | 300 | 300 | 72 |
| 30 | Slag | Water | — | 250 | 180 | 72 |
| 31 | Slag | Water | — | 300 | 180 | 72 |
| 32 | Slag | Water | — | 350 | 180 | 72 | c° = acid concentration,
T = temperature,
P = pressure

Experiments 26, 27, 28 and 29 were conducted in capsules in an acetic acid solution. Due to the presence of CaO and Ca(OH)$_2$ in the steelworks slag, high concentrations of acetic acid are required to achieve the desired pH range.

The solids obtained at the end of the different experiments were analyzed by XRPD. At 300° C., the FeO initially present in the slag was almost completely consumed and a very large proportion of magnetite was observed. At 150° C., the conversion of FeO was very low. Increasing the concentration of acetic acid accelerated magnetite formation.

Experiments 30, 31 and 32 were conducted in an autoclave allowing sample collection in the presence of deionized water. Due to the presence of CaO and Ca(OH)$_2$ in the steel slags, the reaction was conducted at a pH between 11 and 12. The conversion rate calculated from the measurement of produced H$_2$ for experiments 30, 31 and 32 are respectively 9, 20 and 43% after 24 h of reaction. Temperature increase allows a significant acceleration of kinetics. Magnetic separation was performed according to the protocol described above. A first separation of the solid suspended in water was carried out using a permanent magnet at room temperature and under ultrasound. A 1 mol/L hydrochloric acid solution was then added to the separated solid to improve the dissolution of residual Ca phases and, therefore, the purity of the solid obtained at the end. A second separation step was then carried out within the suspension at room temperature and under ultrasound. The solids of the different separation steps were analyzed by XRPD to quantify their wüstite and magnetite proportions.

These analyzes allowed estimating that the solid obtained after reaction at a temperature of 300° C. and 180 bar in the presence of water and following the treatment described above contained about 20 wt % of wüstite and 80 wt % of magnetite (taking into account all the size populations).

Figure 5:
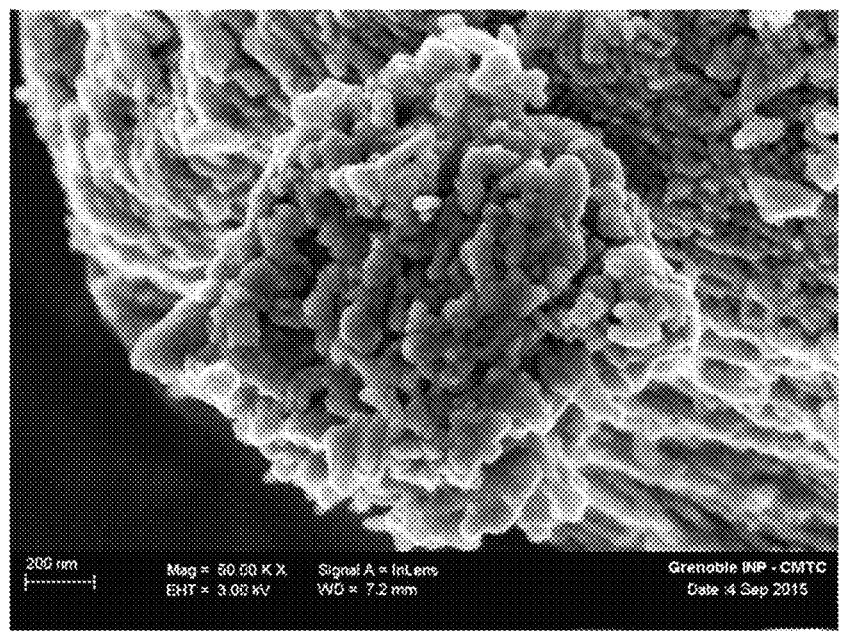
FIG. 5 is an image obtained by FE-SEM (ZEISS Ultra 55 device, using secondary electron detection) of the solid product obtained at the end of experiment No. 31 of Example 4 with a magnification of 50,000
Figure 7:
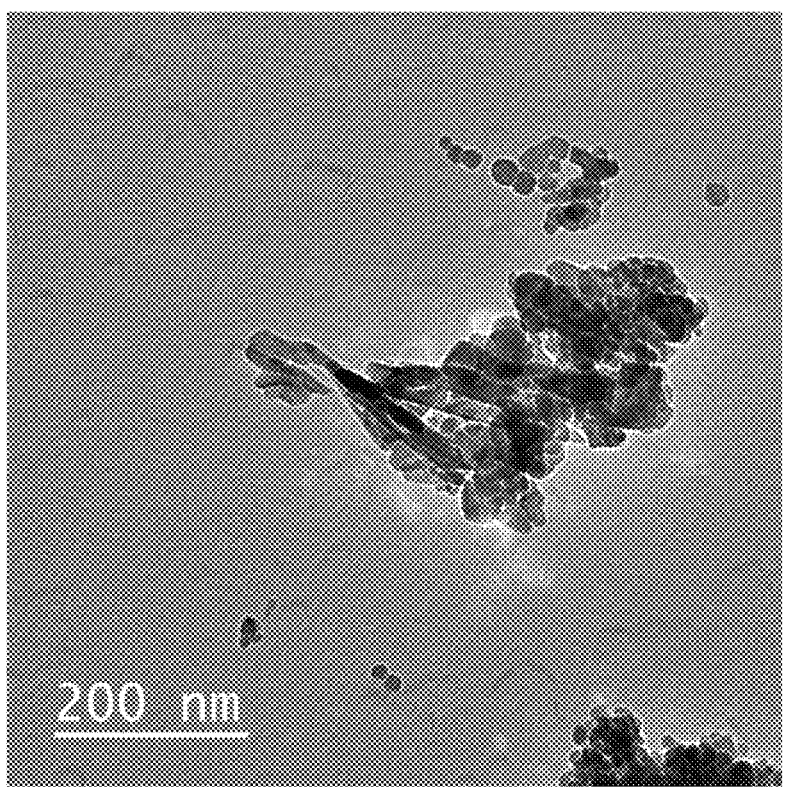
FIG. 7 is a selected-area diffraction (SAD) pattern obtained by Transmission Electronic Microscopy (TEM) (Jeol FEG 2100F device, used at 200 kV) of the solid product obtained at the end of experiment No. 31 of Example 4.

Combined analysis of FE-SEM (FIG. 5, experiment No. 31) and TEM images (FIG. 7, Experiment No. 31) allowed estimating populations and distributions of produced magnetite. The obtained solid contains magnetite in the form of particles with three size populations:
From 10 to 20 nm,
From 100 to 200 nm,
Of micrometer size.

In order to estimate the proportions of each population, it is possible to use a method using intense field gradients thanks to metal fibers immersed within the solution flowing under a strong magnetic field (0.5 to 1.2 T).

Example 5: Preparation of Magnetite from Steel Slag Previously Treated with Acetic Acid Experiments were conducted from steel slag at a temperature of 250° C. and a pressure of 150 bar on samples previously ground and at a slag/solution weight ratio of 1/100.

In Experiment 33, the slag was used without prior treatment. The reaction was carried out in the presence of water for 72 hours and at natural pH of suspended slag, i.e. between 11 and 12.

In Experiment 34, the slag has been pretreated with an aqueous solution of 4 mol/L acetic acid at room temperature (25° C.). This treatment allows decalcifying slag and doubling its iron oxide concentration. The high temperature reaction (250° C.) was carried out in the presence of a aqueous of a 1 mol/L acetic acid solution. The prior decalcification of slag allows working at a pH in the range of 2 to 4. The pH during the reaction at 250° C. was measured between 3.5 and 4.

The proportion of produced hydrogen was monitored with the method described in Example 2 and is provided in FIG. 8. The results show that the conversion is significantly improved by using a slag which had been decalcified beforehand.

The solid products obtained at the end of the reactions were treated as described in Example 4. XRPD analysis allowed quantifying the magnetite and wüstite proportions. Magnetite was the major compound with a proportion higher than 70% by weight of the obtained solid.

REFERENCES

[1] Chaurand P, Rose J, Bottero J-Y, Domas J. Speciation of Cr and V within BOF steel slag reused in road constructions. J. Geochem. Explor. 2006; 88:10-14.
[2] Chaurand P, Rose J, Briois V et al. New methodological approach for the vanadium K-edge X-ray absorption near-edge structure interpretation: Application to the speciation of vanadium in oxide phases from steel slag. J. Phys. Chem. B 2007; 111:5101-5110.
[3] Chaurand P, Rose J, Briois V et al. Environmental impacts of steel slag reused in road construction: A crystallographic and molecular (XANES) approach. J. Hazard. Mater. 2007; 139:537-542.
[4] de Windt L, Chaurand P, Rose J. Kinetics of steel slag leaching: Batch tests and modeling. Waste Manage. 2011; 31:225-235.
[5] Montes-Hernandez G, Pérez-Lopez R, Renard F, Nieto J M, Charlet L. Mineral sequestration of $CO_2$ by aqueous carbonation of coal combustion fly-ash. J. Hazard. Mater. 2009; 161:1347-1354.
[6] Brunet F, Chopin C. Bearthite, Ca2Al(PO4)2(OH): Stability, thermodynamic properties and phase relations. Contrib. Mineral. Petrol. 1995; 121:258-266.
[7] Taut T, Kleeberg R, Bergmann J. The new Seifert Rietveld program BGMN and its application to quantitative phase analysis. Mater. Struc. 1998; 5:57-66.
[8] Saalfeld H, Klaska, K H. The crystal structure of 6 Ca2SiO4.1 Ca3(PO4)2. Zeitschrift für Kristallographie 1981; 155:65-73.
[9] Colville A A, Geller S. The crystal structure of brown-millerite, $Ca_2FeAlO_5$. Acta Cryst. 1971; B27:2311-2315.
[10] Basso R, Giusta A D, Zefiro L. Crystal structure refinement of plazolite: a highly hydrated natural hydrogrossular. Neues Jahrbuch für Mineralogie 1983; 251-258.
[11] Malvoisin B, Carlut C, Brunet F. Serpentinization of oceanic peridotites: 1. A high-sensitivity method to monitor magnetite production in hydrothermal experiments. J. Geophys. Res. 2012; 117:B01104.
[12] Marban G, Valdés-Solís T. Towards the hydrogen economy? Int. J. Hydrogen Energ. 2007; 32:1625:1637.
[13] Hironori et al. (2007) Synthesis of $Fe_3O_4$ nanoparticles with various sizes and magnetic properties by controlled hydrolysis Journal of Colloid and Interface Science 314 274-280
[14] Martinez-Mera et al. (2007) Synthesis of magnetite ($Fe_3O_4$) nanoparticles without surfactants at room temperature. Materials Letters 61, 4447-4451
[15] Malvoisin B., Brunet F., Carlut J., Montes-Hernandez G., Findling N., Lanson M., Vidal O., Bottero J. Y. and Goffé B. (2013) High-purity hydrogen gas from the reaction between BOF steel slag and water in the 473-673 K range. Int. J. Hydrogen Energ. 38(18), 7382-7393.
[16] Eloneva et al. (2008) Steel converter slag as a raw material for precipitation of pure calcium carbonate. Ind. Eng. Chem. Res., 47, 7104-7111.
[17] Kelland (1998) Magnetic separation of nanoparticles. IEEE transactions on magnetics, 34, 2123-2125.

The invention claimed is:

1. A method for producing magnetite comprising the steps of:
(o') combining a wüstite-containing material and a liquid aqueous solution of liquid water and one or more acids to form a reaction mixture, and then
(a') exposing the reaction mixture to a reaction condition comprising:
a pH of the aqueous solution less than 7 when said aqueous solution is at 25° C. and 1 bar, and
a pressure defined to maintain the water in a partial liquid state at a temperature ranging from 100 to 500° C., and maintaining the reaction mixture under the reaction condition for a reaction period of sufficient duration to obtain a solid product comprising magnetite, and then (b') recovering the magnetite in the form of particles comprising three populations of size: from 10 to 20 nm, from 100 to 200 nm, and from 1 to 200 µm, wherein more than 25% by weight of the particles have a nanometric size.

2. The method according to claim 1, wherein the temperature during step (a') is from 150° C. to 500° C.

3. The method according to claim 2, wherein the temperature during step (a') is from 150° C. to 350° C.

4. The method according to claim 1, wherein the pressure during step (a') is from 5 to 700 bar.

5. The method according to claim 1, wherein the pH of the aqueous solution is from 2 to 5.

6. The method according to claim 5, wherein the pH of the aqueous solution is from 2.5 to 3.

7. The method according to claim 1, wherein the aqueous solution comprises an organic acid comprising a group capable of complexing iron ions.

8. The method according to claim 1, wherein the wüstite-containing material is steel slag.

9. The method according to claim 8, wherein the steel slag used in step (a') is decalcified steel slag.

10. The method according to claim 8, wherein steel slags is selected from basic oxygen furnace steel slag and electric arc furnace steel slag.

11. The method according to claim 1, wherein the step (b') of recovering magnetite comprises magnetic separation.

12. The method according to claim 1, wherein the magnetite particles recovered at step (b') comprise nanometric sized particles and micrometric sized particles and wherein the method comprises, after step (b'), a step (c') of separating the nanometric sized particles from the magnetite particles obtained at the end of step (b').

13. The method according to claim 1, wherein the wüstite-containing material is wüstite.

14. The method according to claim 1, wherein the aqueous solution further includes carboxylic acid, wherein the carboxylic acid maintains the pH of the aqueous solution at less than 7.

15. A method for producing hydrogen gas comprising the steps of:

(o') combining c steel slags including wüstite-containing material and a liquid aqueous solution of liquid water and one or more acids to form a reaction mixture, and then (a) exposing the reaction mixture to a reaction condition comprising:
  a pH of the aqueous solution less than 7 when said aqueous solution is at 25° C. and at 1 bar, and
  a pressure defined to maintain the water in a partial liquid state at a temperature ranging from 150° C. to 500° C., and maintaining the reaction mixture under the reaction condition for a reaction period of sufficient duration to generate hydrogen gas;

(b) cooling down the reaction product of step (a) to separate the hydrogen gas from water steam; and (c) collecting the hydrogen gas, wherein the hydrogen purity is higher than 99.9 molar % and a production rate is up to about 30 NL of hydrogen per kg of steel slags.

16. The method according to claim 15, wherein step (a) is carried out without adding a catalyst.

17. The method according to claim 15, wherein, prior to step (a), said steel slags are carbonated.

18. The method according to claim 15 wherein the hydrogen purity is higher than 99.995 molar %.

19. A method for producing hydrogen gas and magnetite comprising the steps of:

(o') combining steel slags including wüstite-containing material and a liquid aqueous solution of liquid water and one or more acids to form a reaction mixture, and then (a) exposing the reaction mixture to a reaction condition comprising:
  a pH of the aqueous solution less than 7 when said aqueous solution is at 25° C. and at 1 bar, and
  a pressure defined to maintain the water in a partial liquid state at a temperature ranging from 150° C. to 500° C. and
  maintaining the reaction mixture under the reaction condition for a reaction period of sufficient duration without adding a catalyst to obtain reaction products:
  in the form of a gaseous phase comprising a hydrogen gas, and
  in the form of a solid product comprising magnetite;

(b) cooling down the reaction product in the form of a gaseous phase of step (a) to separate the hydrogen gas from water steam; and (c) collecting the hydrogen gas, wherein the hydrogen gas purity is higher than 99.9 molar % and a production rate is up to about 30 NL of hydrogen per kg of steel slags;

(b') recovering the magnetite from the solid product comprising magnetite obtained at the end of step (a) in the form of particles comprising three populations of size: from 10 to 20 nm, from 100 to 200 nm, and from 1 to 200 µm.

20. The method according to claim 19, wherein more than 25% by weight of the magnetite particles have a nanometric size.

* * * * *